United States Patent [19]
Nicholas et al.

[11] Patent Number: 5,671,899
[45] Date of Patent: Sep. 30, 1997

[54] AIRBORNE VEHICLE WITH WING EXTENSION AND ROLL CONTROL

[75] Inventors: Paul H. Nicholas, Burbank; Larry Lipera, Lancaster; Stephen G. Justice, Santa Clarita; Joseph M. Wurts, Valencia, all of Calif.

[73] Assignee: Lockheed Martin Corporation, Bethesda, Md.

[21] Appl. No.: 606,928

[22] Filed: Feb. 26, 1996

[51] Int. Cl.⁶ .................................. B64C 3/40; B64C 3/56
[52] U.S. Cl. .................. 244/49; 244/3.28; 244/46; 74/100.1
[58] Field of Search ................................ 244/39, 46, 49, 244/3.24, 3.27, 3.28; 74/97.1, 100.1

[56] References Cited

U.S. PATENT DOCUMENTS

| | | | |
|---|---|---|---|
| 2,695,144 | 11/1954 | Woods | 244/46 |
| 2,980,366 | 4/1961 | Wallis | 244/46 |
| 3,703,998 | 11/1972 | Girard | 244/49 X |
| 3,861,627 | 1/1975 | Schoffl . | |
| 3,921,937 | 11/1975 | Voss . | |
| 4,029,270 | 6/1977 | Niemeier . | |
| 4,106,727 | 8/1978 | Ortell | 244/49 |
| 4,223,611 | 9/1980 | Dawson et al. | 74/100.1 X |
| 4,351,499 | 9/1982 | Maudal . | |
| 4,659,036 | 4/1987 | Pinson . | |
| 4,691,880 | 9/1987 | Frank | 244/49 |
| 5,035,378 | 7/1991 | Spanovich . | |
| 5,114,095 | 5/1992 | Schroppel et al. | 244/3.28 |
| 5,141,175 | 8/1992 | Harris . | |
| 5,150,861 | 9/1992 | Merkel . | |
| 5,192,037 | 3/1993 | Moorefield . | |
| 5,439,188 | 8/1995 | Depew et al. . | |

FOREIGN PATENT DOCUMENTS

| | | |
|---|---|---|
| 404297799 | 10/1992 | Japan . |
| 790540 | 2/1958 | United Kingdom . |
| 2154715 | 9/1985 | United Kingdom . |

*Primary Examiner*—William Grant
*Attorney, Agent, or Firm*—Robert A. Schruhl

[57] ABSTRACT

The invention is an airborne vehicle. In detail, the invention includes a main body having a longitudinal, lateral and vertical axis. A pair of wings are pivotally mounted to the main body that are movable about an axis of rotation from a retracted position to an extended position external of the main body along the lateral axis. A linkage assembly for controlling the position of the wings is mounted within the vehicle that includes a guide assembly having an open ended slot aligned with the longitudinal axis thereof. First and second links have their first ends pivotally connected to the wings at a position offset from the axis of rotation of the wings, and the second ends thereof pivotally coupled to each other. A pin is rotatably coupled to the second ends of the first and second links and is movable from a first position within the slot wherein the first and second links are at an acute angle to each other to a second position external of the open end of the slot wherein the first and second links are rotated to a greater angular relationship. A spring is incorporated for urging the first and second links to the greater angular relationship. A latch is incorporated for securing the first and second links in the greater angular relationship after the pin exits the open end of the slot. An actuator is used to move the pin from the first position to the second position and, additionally, along the lateral axis when the pin is in the second position.

9 Claims, 5 Drawing Sheets

AIRBORNE VEHICLE WITH WING EXTENSION AND ROLL CONTROL

BACKGROUND OF THE INVENTION

1. Field of the Invention

The invention relates to the field of airborne vehicles and, in particular, to an airborne cruise missile having folded wings that are extended during flight and the actuation system therefore.

2. Description of Related Art

Modern cruise missiles, such as the Tomahawk, have retractable wings allowing internal storage within the bomb bay of the vehicle, typically mounted on rotary launchers therein. For example, U.S. Pat. No. 5,035,378 "Variable Alignment Mechanism" by Joseph P. Spanovich discloses a system for extending the wings of a missile by means of a single actuator. The wings are pivotally mounted to the fuselage and are coupled to either side of a slidable member by means of connecting rods. The slide is guided along the longitudinal axis by means of a pin mounted thereto that rides in a slot. The actuator moves the member down the slot causing the wings to extend. The front end of the slot is expanded such that the pin can move slightly sideways so that any tolerance build-up in the mechanism can be absorbed insuring that the wings can be fully retracted. U.S. Pat. No. 5,141,175 "Air Launched Munition Range Extension System And Method" by Gordon L. Harris discloses a screw mechanism for extending the wings. Japanese Patent No. 404297799 A "Guided Missile" by M. Akiguchi discloses a wing actuation system using a single actuator coupled to the wings by means of a gear drive system. United Kingdom Patent Application No. 2154715A "Aerodynamic Mechanism For Missiles" by H. Hutter, et al. discloses a system wherein a single actuator operating a cable and pulley system is used to extend the wings. U.S. Pat. No. 5,192,037 "Double-Pivoting Deployment System For Aerosurfaces" by William J. Moorefield discloses a system for deploying wings, stored backward along the fuselage in the vertical plane, by initially rotating the wings so they are horizontal and then extending the wings outward. U.S. Pat. No. 3,861,627 "Foldable Control Flap Unit, Especially For Rockets" by Rainer Schoffl and U.S. Pat. No. 4,659,036 "Missile Control Surface Actuator System" by George T. Pinson. Both disclose rocket powered projectiles having folded fins that are automatically deployed during flight. U.S. Pat. No. 4,351,499 "Double Fabric, Self-Erecting Wing For Missile" by Inge Maudal, et al. discloses an extendible fabric covered fin for use on a missile. However, none of the above systems provides the ability to provide roll control using the same mechanism used for deploying the wings and/or fins.

U.S. Pat. No. 4,029,270 "Mechanical Roll Rate Stabilizer For A Rolling Missile" by Byron M. Niemier discloses a gear drive assembly for rotating fins on a missile in opposite directions. Great Britain Patent Specification No. 790,540 "Improvements Relating To Missiles" by Frank Martin, et al. discloses a linkage system for providing both collective and counter rotation of airfoils for simultaneous pitch and roll control. However, neither provide for storing the airfoils in a retracted position for storage purposes prior to flight. U.S. Pat. No. 5,439,188 "Control System" by Herbert D. Depew, Jr., et al. uses a single set of opposed fins for both pitch and yaw control. The missile is spin stabilized during flight and the fins are adjusted during appropriate portions of each revolution to provide pitch and yaw control. The problem here is that it is only usable on a spin stabilized missile or the like.

U.S. Pat. No. 3,921,937 "Projectile Or Rocket Preferably With Unfolded Tail Unit" by Alfred Voss, et al. discloses a system for deploying stored fins on a missile and providing roll and pitch control. However, a separate actuation system is used for both functions. U.S. Pat. No. 5,150,861 "Variable Sweep Side Force Generator And Roll Control Device" by Edwin W. Merkel, et al. is of interest in that it discloses a missile having wings and a separate vertical fin that can be deployed from a stored position to variable positions of deployment for providing both side force and roll control. However, this system is simply a single airfoil deployment system.

Thus it is a primary object of the subject invention to provide a wing extension system for an airborne vehicle.

It is another primary object of the subject invention to provide a combination wing extension system and roll control system for an airborne vehicle.

It is a further object of the subject invention to provide a combination wing extension system and roll control system for an airborne vehicle that uses only one actuator.

It is a further object of the subject invention to provide a combination wing extension system and roll control system for an airborne vehicle where the roll control is provided by differentially varying the sweep angle of each wing.

SUMMARY OF THE INVENTION

The invention is an airborne vehicle and, in particular, a cruise missile. In detail, the invention includes a main body or fuselage having a longitudinal, lateral and vertical axis. The vehicle includes a pair of wings pivotally mounted to the main body that are movable about an axis of rotation from a retracted position to an extended position. A linkage assembly is provided for extending the wings and, after extension, for simultaneously increasing the sweep angle of one wing while decreasing the sweep angle of the opposite wing to provide roll control.

In detail, the linkage assembly includes a guide rail having an open ended slot aligned with the longitudinal axis of the main body and mounted therein. First and second links have their first ends coupled to the wings at a position offset from the axis of rotation thereof. Preferably, the wings incorporate arms that provide the offset. The second ends of the links are pivotally coupled to each other. A pin is rotatably coupled to the second ends of the first and second links and which is movable from a first position within the slot, wherein the first and second links are at an acute angle to each other and the wings are in a retracted position to a second position external of the open end of the slot, wherein the first and second links are rotated to a greater angular relationship and the wings are in an extended position. Preferably, the greater angular relationship is slightly over 180 degrees.

A latch assembly is coupled to the first and second links for securing them in the greater angular relationship after the pin exits the open end of the slot. An actuator is coupled to one of the links such that it can move the pin along the longitudinal axis from the first position, wherein the links are at the acute angle, to the second position, wherein the pin is free to the slot and the links are in the greater angular relationship. The actuator can, additionally, move the first and second links along the lateral axis such that the sweep of one wing is increased while the other is decreased. This, of course, will decrease the lift produced by the wing with the increased sweep and increase the lift from the wing having its sweep angle decreased providing the roll control.

Preferably, the latch assembly is an over center style latch having a spring with its ends attached to the first and second links in proximity to the second ends of links, for urging the first and second links to the greater angular relationship from a point wherein the pin is in proximity to the open end of the slot to the pin's second position. The latch also includes a lug mounted on one of the links and a stop on the other which come in to contact with each other when the links reach the over center position, preventing further rotation there between.

Additionally, the slot includes a pair of side walls and the side wall adjacent to the link to which the actuator is coupled to is longer in length then the opposite side wall, and further includes an end at the opening that includes a radius. This is desirable because when the pin exits the open end of the slot, the over center latch assembly is not latched at this point. Having the one side wall with the longer length and radius will insure that drag forces on the opposite side wing that are transmitted via the link coupled directly thereto will not retard or prevent the links from reaching the over center position. The only effect will be a slight movement of the wings from a symmetrical position until the spring forces the latch to the over center position and wing position fully controlled by the actuator. Of course, a one way clutch installed between the second ends of the links will prevent a decrease in angular relationship between the links. However, by proper sizing of the spring, the links will be assured of reaching the over center position with or without the side wall extension.

Thus upon initial release of the vehicle from the wing or bomb bay of an aircraft, the actuator initially causes the wings to extend. Once the over center position is reached, the actuator is used to simultaneously increase the sweep of one wing while decreasing the sweep of the other wing to provide roll control. Because the vehicle is released from an aircraft at speed, roll control by such means is immediately effective. It is believed that this method of roll control would not be effective at the initial low speeds of a normal ground takeoff, unless the vehicle were launched at high speeds by a booster rocket or the like.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

DESCRIPTION OF THE PREFERRED EMBODIMENT

Figure 1:
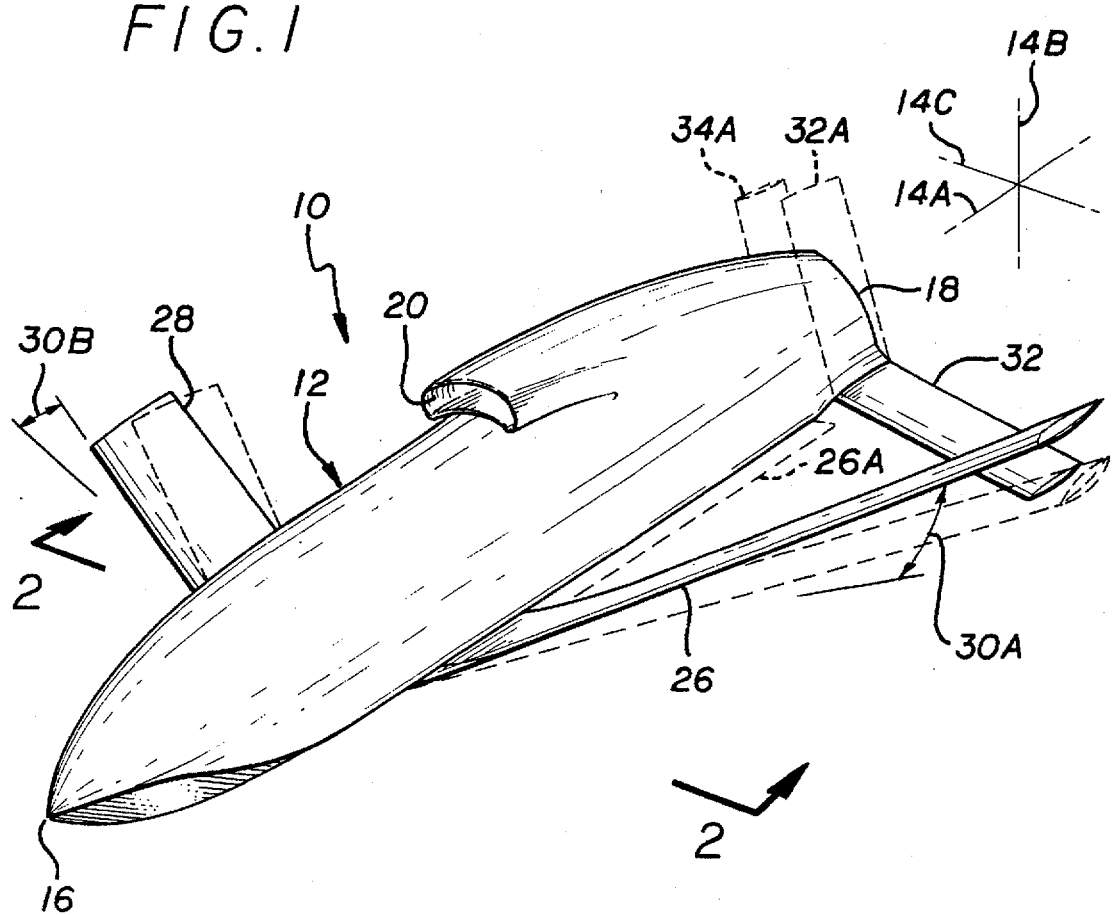
FIG. 1 is a perspective view of the vehicle.
Figure 2:
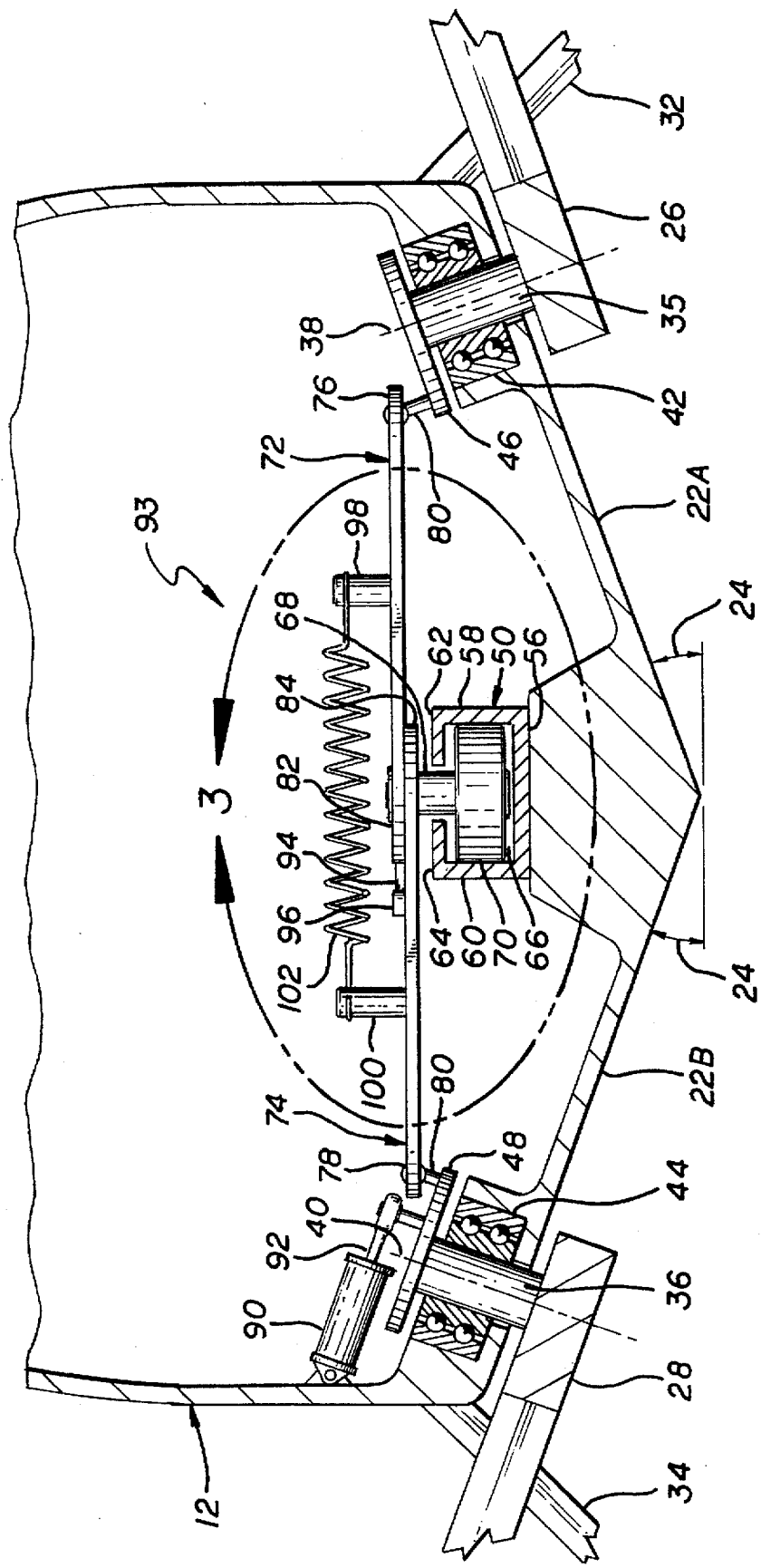
FIG. 2 is a partial cross-sectional view of the vehicle taken along the line 2—2.

Referring to FIGS. 1 and 2, the vehicle, generally indicated by numeral 10, is depicted, for purposes of illustration, as an air launched cruise missile. The vehicle 10 includes a fuselage or main body 12 having a longitudinal axis 14A, a vertical axis 14B and a lateral axis 14C, with a nose 16 and tail 18, and a top mounted air intake 20. The underside 22 of the vehicle is in the shape of a shallow "V" having surfaces 22A and 22B at an acute angle 24 to the lateral axis 14C. A pair of wings 26 and 28 are pivotally mounted to the bottom surfaces 22A and 22B. The wings 26 and 28 are rotatable from a stored position shown in dotted lines and indicated by 26A and 28A to the fully extended positons shown in solid lines at a sweep angle 30A and 30B. Thus the angle 24 is also the dihedral angle of the wings 26 and 28.

Furthermore, as will be subsequently discussed, the wing sweep angles 30A and 30B can be varied such that one is increased as the other is decreased also indicated in dotted lines and numerals 26B and 28B. The vehicle, includes V tails 32 and 34 that prior to launch are in stored positions indicated in dotted lines and numerals 32A and 34A. The wings 26 and 28 have pivot pins 35 and 36 with pivot axis 38 and 40 supported by bearing assemblies 42 and 44 located on the bottom surfaces 22A and 22B. The pins 34 and 36 have crank arms 46 and 48, respectively, attached thereto.

Figure 3:
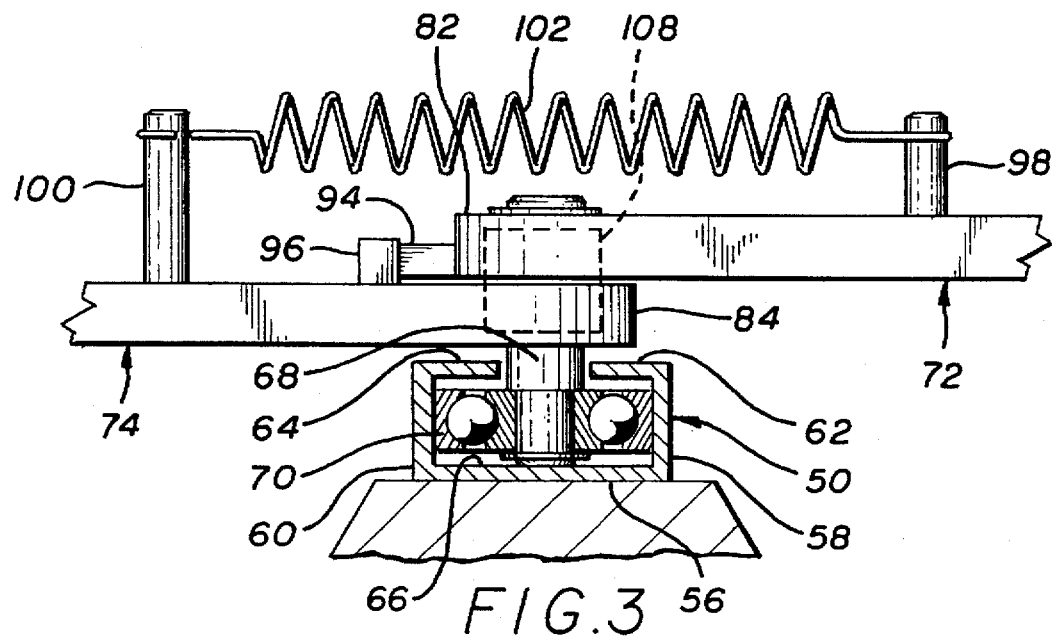
FIG. 3 is an enlarged view of a portion of FIG. 2 within the circle indicated by numeral 3.
Figure 4:
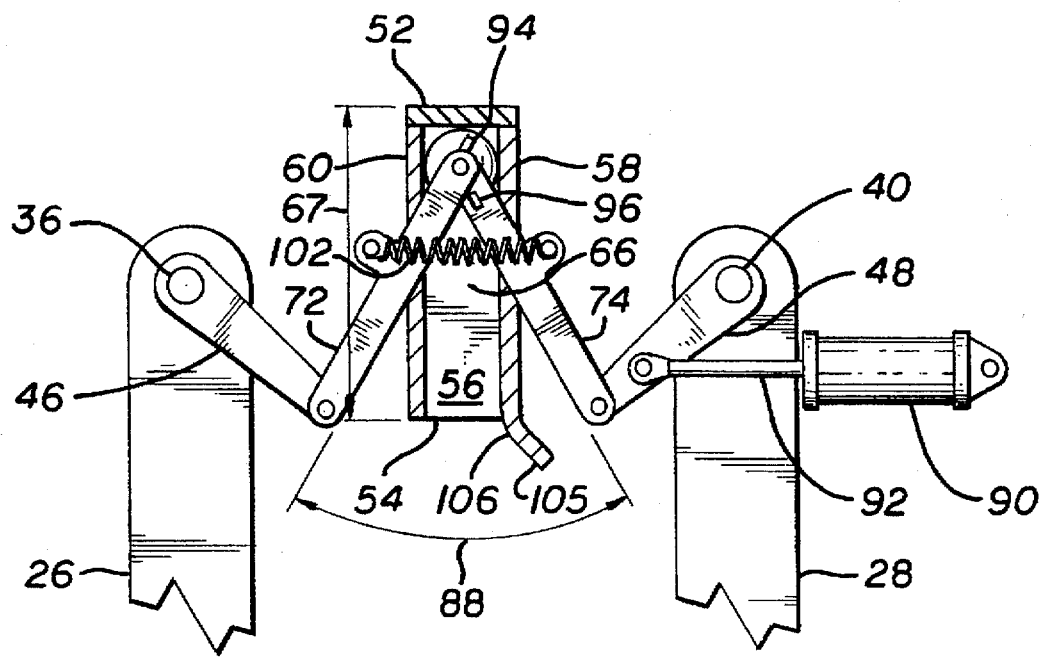
FIG. 4 is a partial top view of the wing actuation system shown in FIG. 2.

Still referring to FIGS. 1 and 2, and additionally to FIGS. 3 and 4, a guide track 50 is mounted within the main body 12 having a closed end 52 and an open end 54, a bottom wall 56, side walls 58 and 60, and finally upper lips 62 and 64 forming a slot 66 having a length 67. A pin 68 is slidably mounted within the slot by means of a bearing 70 attached to its bottom end and has a top end that extends out the top of the track 50. A pair of links 72 and 74 are coupled by their first ends 76 and 78 to the arms 46 and 48 by means of bearing assemblies 80. The second or opposite ends 82 and 84 are rotatably coupled to the top end of the pin 68. The physical positioning of the pivot axis 38 and 40 of the wings 26 and 28, and the track 50, cause the links 72 and 74 to be at an acute angle 88 to each other when the wings are in the retracted position. An actuator 90 is mounted within the main body 12 that includes a piston rod 92 that is coupled to the crank arm 48.

An over center latch assembly 93 is incorporated that comprises a lug 94 mounted on the link 72 in proximity to the second end 74 and stop member 96 on the second end 84 of the link 74. The links 72 and 74 also have protrusions 98 and 100 that extend upward and to one side therefrom also in proximity to the second ends 76 and 78 and a spring 102 connected between the two protrusions biases the two links 72 and 74 toward each other. The acute angle 88 is maintained because the wings 26 and 28 are in the retracted position and can not move further.

Figure 5:
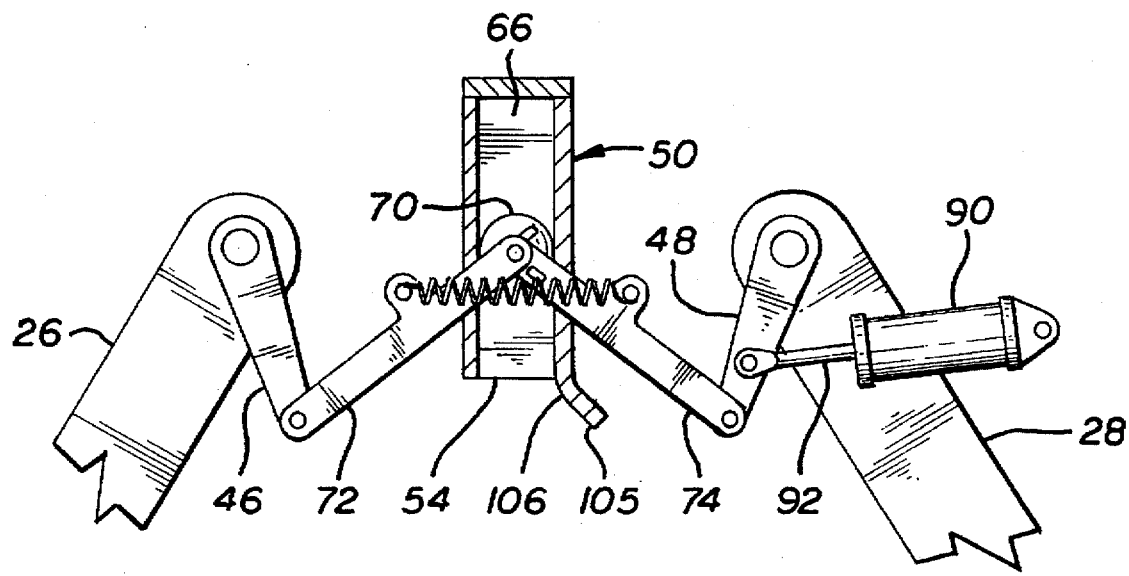
FIG. 5 is a view of the wing actuation system shown in FIG. 4 with the system in the partially extended position.
Figure 6:
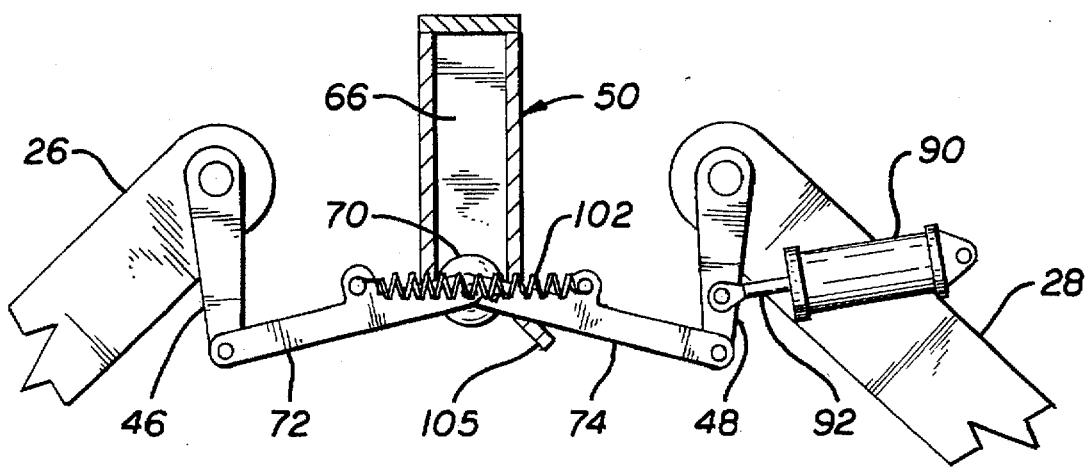
FIG. 6 is a view of the wing actuation system shown in FIG. 4 with the system in an further extended position.

Still referring to FIGS. 1 through 4 and, additionally, to FIGS. 5 though 8, after the vehicle 10 has been dropped from an aircraft, the actuator 90 is signaled to retract rod 92. This causes the arm 46 to rotate clockwise extending wing 26. The second ends 76 and 78 of the links 72 and 74 and pin 68 are pulled down the slot 66 causing the angle therebetween to increase (FIG. 5). This causes link 74, coupled to arm 48, to simultaneously counter clockwise rotate wing 28 to the extended position in unison with the wing 26. As the pin 68 moves further down the slot 66 the angle between the two links 72 and 74 continues to increase and, prior to pin exiting the slot, protrusions 98 and 100 move to the opposite side of the pin and the spring 102 now tends to cause the links to continue to angularly move apart (FIG. 6).

Figure 7:
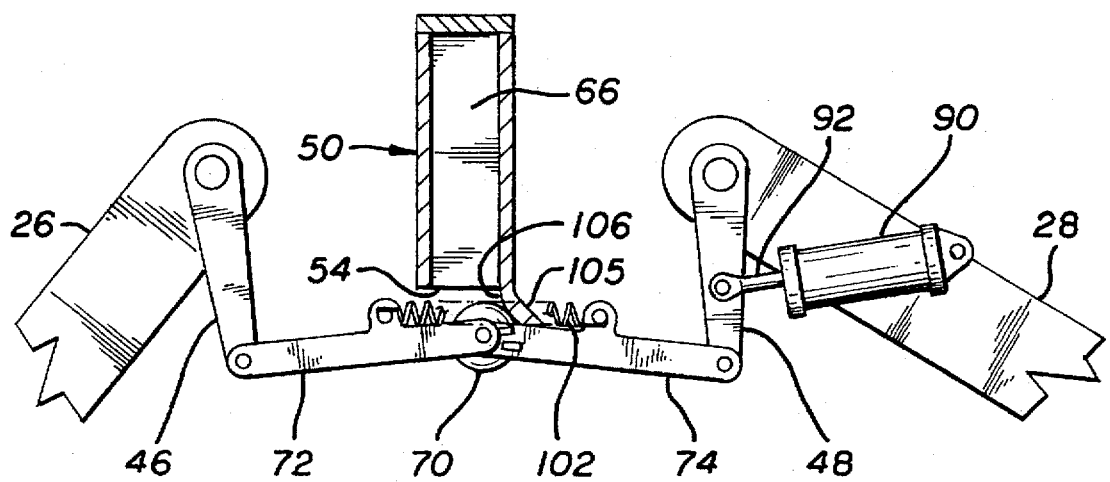
FIG. 7 is a view of the wing actuation system shown in FIG. 4 with the system in the almost fully extended position.
Figure 8:
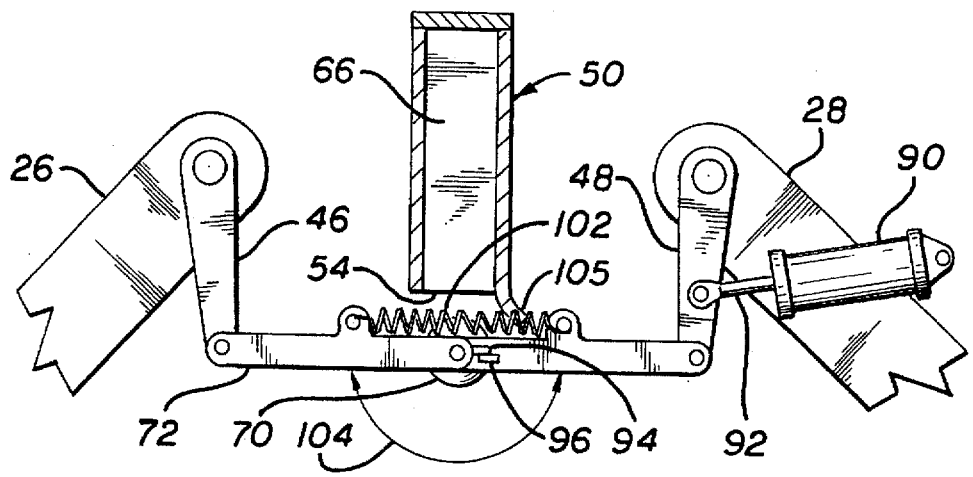
FIG. 8 is a view of the wing actuation system shown in FIG. 4 in the fully extended position.

Because the angular position of the links 72 and 74 are not over center at the point the pin 68 leaves the slot 66 (FIG. 7), aerodynamic drag on the wing 28 will tend to drive the links away from the over center position. However, proper sizing of the spring 102 will insure that the links 72 and 74 are "pulled" to the over center position. Additionally, this drag force tending to retard the links 72 and 74 from reaching the over center position can be mitigated by providing an extension 105 to the side wall 58 incorporating a well rounded radius 106 at its end. Thus as the wing 28 tends to force the links toward the wing 26, the extension 105 allows the actuator 90 to resist this motion and allows the spring 102 to force the links 72 and 74 into the over center position at an angle 104, slightly over 180 degrees apart (FIG. 8). The lug 96 contacts the stop 96 and no further angular change between the links 72 and 74 can occur.

Of course, a one way clutch 108 incorporated between the second ends 78 and 80-(as shown in dotted lines and numeral 108 in FIG. 3) would prevent any reverse motion of the links. In fact, even if the links 72 and 74 did not reach the over center position, they would still be locked in place so that the actuator could still move the wings to provide roll control.

Figure 9:
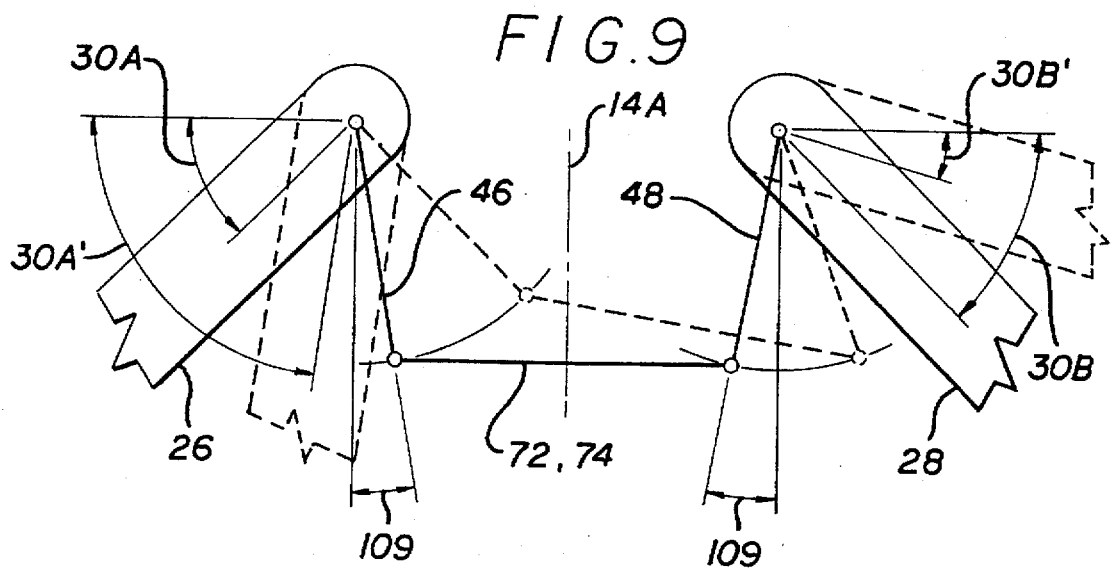
FIG. 9 is a schematic view of the actuation system illustrating the differential extension and retraction of the wings produced by the linkage system when providing roll control.
Figure 10:
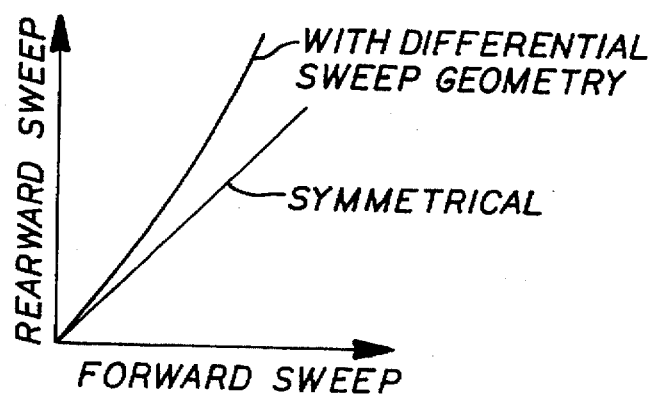
FIG. 10 is a graph illustrating the difference in angular extension of the wing being extended and to the one being retracted when providing roll control.

However, once the over center position is reached, the actuator 90 can be used to adjust the wing sweep angle 30A and 30B by modulating the position of the piston rod 92. As illustrated in FIG. 9, the system is designed so that the arms 46 and 48 are angled toward each other at an acute angle 109 when the wings 24 and 26 are in the extended position. This insures that the wing being retracted (as illustrated, wing 26) is moved a greater number of degrees to a sweep angle indicated by numeral 30A' than the wing 28 being extended which is moved to a sweep angle 30B', providing more effective roll control. Such differential displacement of the wings reduces cross-coupling effects in pitch and yaw. The effect of the inward angled arms 46 and 48 is illustrated in FIG. 10.

Thus it can be seen that the invention allows the use of only one actuator to both extend the wings and provide roll control by modulating the sweep angle thereof. While modulating sweep angle at low takeoff and climb speeds would normally not provide sufficient roll control, at the launch velocity of the vehicle from an aircraft at 350 miles per hour or better sufficient roll control can be obtained. Of course, if the vehicle were boosted off the ground by a solid propellant rocket or the like, sufficient speed would be reached before roll control was required.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

INDUSTRIAL APPLICABILITY

The invention has applicability to the aircraft industry.

We claim:

1. An airborne vehicle comprising:

a main body having a longitudinal, a lateral and a vertical axis;

a pair of wings pivotally mounted to said main body, each of said wings bring movable about an axis of rotation from a retracted position to an extended position external of said main body along the lateral axis;

a linkage assembly comprising:

a guide means having an open ended slot aligned with the longitudinal axis of said main body and mounted therein;

first and second links each having first and second ends, said first ends of said first and second links coupled to said wings at a position offset from the axis of rotation of said wings, and said second ends thereof pivotally coupled to each other, pin means rotatably coupled to said second ends of said first and second links, said pin means movable from a first position within said slot wherein said first and second links are at an acute angle to each other to a second position external of said open end of said slot wherein said first and second links are rotated to a greater angular relationship; and latch means for securing said first and second links in said greater angular relationship after said pin means exits said open end of said slot; and means to move said pin means from said first position to said second position and, additionally, along the lateral axis when said pin means is in said second position.

2. The vehicle as set forth in claim 1 wherein said latch means includes biasing means for urging said first and second links to said greater angular relationship from a point wherein said pin means is in proximity to said open end of said slot to said pin means second position.

3. The vehicle as set forth in claim 2 wherein said greater angular relationship is slightly over 180 degrees.

4. The vehicle as set forth in claim 3 wherein said biasing means is a spring having its ends attached to said first and second links in proximity to said second ends of said first and second links.

5. The vehicle as set forth in claim 1, or 2, or 3, or 4 comprising:

each of said wings incorporating an arm having a first end mounted in proximity to said axis of rotation of said wing;

said first ends of said first and second links being connected to a second end of a respective one of said arms.

6. The vehicle as set forth in claim 5 wherein said means to move said pin means comprises an actuator having a first end pivotally coupled to said main body and a second end pivotally coupled to one of said arms.

7. The vehicle as set forth in claim 6 wherein said slot includes a pair of side walls each being adjacent to one of said wings and incorporated arm, and said side wall adjacent to said arm to which said actuator is coupled is longer in length than the other of said pair of side walls, and further has an end at said open end of said slot that includes a radius.

8. The vehicle as set forth in claim 6 wherein said arms are toed in toward said longitudinal axis of said main body at an acute angle when said wings are symmetrically extended.

9. The vehicle as set forth in claim 8 comprising a one way clutch mounted about said pin means and coupled to both said first and second links such that said links can only rotate in relationship to each other toward said greater angular relationship.

* * * * *